Oct. 24, 1933. M. CHARLES 1,931,952
HYDRAULIC POWER TRANSMITTING SYSTEM
Filed Jan. 25, 1929
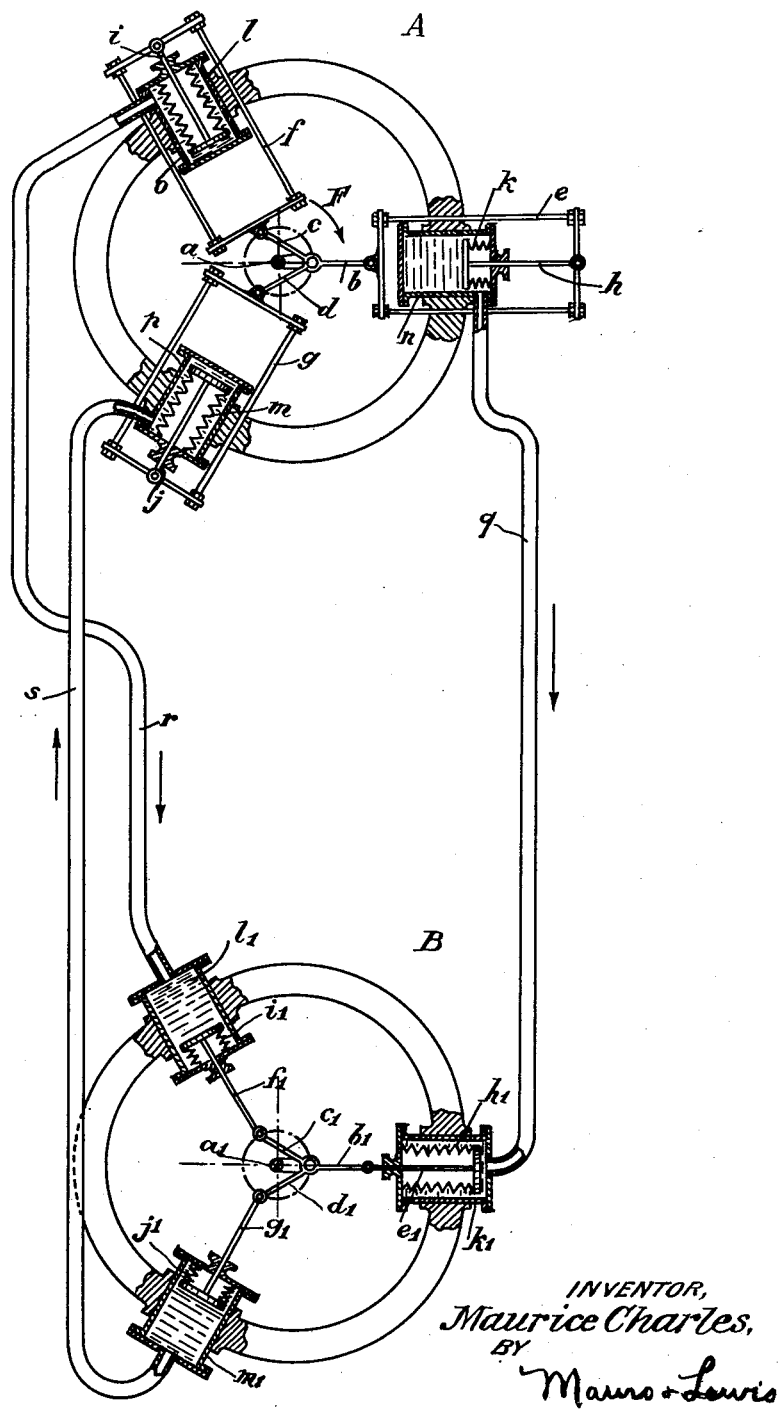
INVENTOR,
Maurice Charles,
BY
Mauro & Lewis
ATTORNEYS.

Patented Oct. 24, 1933

1,931,952

UNITED STATES PATENT OFFICE 1,931,952

HYDRAULIC POWER-TRANSMITTING SYSTEM

Maurice Charles, Courbevoie, France

Application January 25, 1929, Serial No. 335,127, and in France February 2, 1928

6 Claims. (Cl. 60—54.5)

My invention relates to a device for transmitting power and reproducing synchronous movement at a distance, hydraulically.

Electricity has already been called upon to synchronize two apparatuses by means of an alternator and synchronous motors, but the problem of producing a generating apparatus moved by human force and accomplishing, without auxiliary force or auxiliary motor, at a receiving apparatus, a movement and work which is identical to the movement and work exerted thereupon, and this at a relatively long distance, has not been satisfactorily solved, considering the small output of these apparatuses in general.

My invention is particularly suitable for use in all cases where electricity cannot be employed, be it on account of the small amount of power brought into play, be it due to the danger presented by the electric current, to localities in which inflammable substances or gases are disposed, high tension apparatus and due to analogous causes.

My invention will be more readily understood by those skilled in the art to which my invention relates with reference to the accompanying drawing forming part of this specification and in which—

Fig. 1 is a diagram of an installation provided with a generator and a receiver interconnected by pipe lines of suitable length;

Referring to the drawing more in detail the generator indicated generally at A is provided with a crank shaft $a$, on which are mounted three connecting rods $b$, $c$, $d$, controlling through the medium of three sliding frames $e$, $f$, $g$, rods $h$, $i$, $j$ of three bellows $k$, $l$, $m$, similar to those described and claimed in my copending applications Serial No. 35,740, filed June 8, 1925, Ser. No. 176,687, filed March 19, 1927, and Ser. No. 193,207, filed May 21, 1927.

The said bellows are disposed respectively in three cylinders $n$, $o$, $p$ arranged in 120° relation and connected by fittings to three pipe lines $q$, $r$, $s$ respectively.

The receiver indicated generally at B is provided with a crank shaft $a^1$ of the same radius as the generator crank shaft $a$, three connecting rods $b^1$, $c^1$, $d^1$ of the same length as the connecting rods $b$, $c$, $d$ of the generator, the said receiver connecting rods directly engaging rods $e^1$, $f^1$, $g^1$ of three bellows $h^1$, $i^1$, $j^1$ whose dimensions are identical to the generator bellows $k$, $l$, $m$.

Said receiver bellows are contained in three cylinders $k^1$, $l^1$, $m^1$, connected by fittings to pipe lines $q$, $r$, $s$.

The pipe lines and the cylinders being carefully filled with liquid, and the connecting rods occupying the position shown in Fig. 1, the crank shaft $a$ is caused to turn through some chosen angle in the direction of the arrow F.

The connecting rod $b$ which is in neutral position as shown in Fig. 1, carried along by the crank shaft draws on the frame $e$, which, in becoming displaced along a line parallel thereto, bears on the rod $h$, expands the bellows $k$ and drives out a certain quantity of liquid from the cylinder $n$ into the pipe line $q$ and thence into the cylinder $k^1$. The liquid being incompressible collapses the bellows $h^1$ to a degree rigorously equal to the stroke of bellows $k$.

At the same time, the crank shaft $a$ acts on the bellows $l$ through the medium of the connecting rod $c$ of the sliding frame $f$ and the rod $i$, expanding the said bellows and provoking a collapsing, of the same amplitude, of bellows $i^1$ through the medium of the pipe line $r$. In addition, the connecting rod $d$ pushes the frame $g$, which, through the medium of the rod $j$ collapses the bellows $m$. Under these conditions the liquid contained in the cylinder $m^1$ is able to pass into the cylinder $p$ through the pipe line $s$, the bellows $j^1$ expanding or collapsing in accordance with the displacement of the rod $g^1$ connected to the connecting rod $d^1$.

The crank shaft $a^1$ is therefore solicited by two forces; the force of the bellows $i^1$ which primes the movement of rotation, and the force of bellows $h^1$ which continues such rotation.

If at this moment the driving force is removed from the crank shaft $a$, the crank shaft $a^1$ stops in the same position as that of the generator crank shaft.

If, on the contrary, the crank shaft $a$ is caused to continue to rotate in any direction, at a predetermined angular speed, the crank shaft $a^1$ will have imparted thereto the same angular speed, and will stop when the crank shaft $a$ is stopped, after having accomplished the same number of revolutions as crank shaft $a$.

On the other hand, starting of the receiver is always possible, each cylinder furnishing a driving force of 180° per revolution, while the disposition of the connecting rods is at 120°.

The uses to which my apparatus may be put are numerous and a few of its more important applications will now be described by way of example.

Transmission of power at a distance

The power available at the receiving shaft is a function of the power received by the generator, and is only limited by the maximum pressure of the liquid depending on the resistance of the bellows and the pipe lines thereto.

Transmission of synchronous movement with a motor instrumentality control

The invention may be applied to station indicators, remote control systems for electric motors and, in general, wherever it is desired to maintain a pair of mechanical elements at a distance from one another in synchronous relation as to time and in parallel relation in space.

While in the example given in the drawing there is a group of three cylinders at both the transmitting and the receiving station, I do not wish to be limited to such a specific arrangement as there might be any number of cylinders at each of said stations without departing from the principle of the invention.

Obviously my invention as hereinbefore disclosed is susceptible to modifications in detail as concerns the various elements of the device without departing from the spirit or scope of my invention insofar as the said modifications come within the scope of the appended claims.

Having described my invention what I claim as new and desire to secure by Letters Patent is:

1. A hydraulic system for transmitting power and synchronously reproducing movement at a distance which comprises two sets of identical cylinders, all the cylinders of one set having their axes located in the same plane, each set comprising the same number of cylinders similarly disposed with respect to one another, two sets of pressure generating bellows each disposed in one of said cylinders and adapted to close one end thereof, one operating rod for each cylinder adapted to slide through said end thereof, extending inside said bellows and secured to the inner end thereof, a plurality of pipes each connecting the closed end of one cylinder of the first set to the closed end of the corresponding cylinder of the second set, a liquid entirely filling the space between the bellows, two identical crank-shafts respectively at right angles to the axes of the two sets of cylinders, a connecting rod between the operating rod of each cylinder of the first set and the corresponding crank-shaft, a rigid frame secured to each operating rod of the second set and adapted to reciprocate therewith, a connecting rod identical with the first mentioned connecting rod interposed between the reciprocating frame of each cylinder of the second set and the second crank-shaft, disposed in a direction with respect to its cylinder which is directly opposite to that of the corresponding connecting rod of the first set with respect to its cylinder, whereby rotation of one of the shafts is synchronously transmitted to the other shaft.

2. A hydraulic system for transmitting power and synchronously reproducing movement at a distance which comprises two sets of identical fixed cylinders, each cylinder of one set being parallel to a corresponding cylinder of the other set, two sets of pressure generating bellows each disposed in one of said cylinders and adapted to close one end thereof, one operating rod for each cylinder adapted to slide through said end thereof extending inside said bellows and secured to the inner end thereof, a plurality of pipes each connecting the closed end of one cylinder of the first set to the closed end of the parallel cylinder of the second set, a liquid entirely filling the space between the two bellows, two identical parallel crank-shafts respectively at right angles to the axes of the two sets of cylinders, a connecting rod between the operating rod of each cylinder of the first set and the corresponding crank-shaft, a rigid frame secured to each operating rod of the second set and adapted to reciprocate therewith, a connecting rod identical with the first named connecting rod interposed between the reciprocating frame of each cylinder of the second set and the second crank-shaft, disposed in a direction which is directly opposite to that of the first named corresponding connecting rod, whereby rotation of one of the shafts is synchronously transmitted to the other shaft.

3. A hydraulic system for transmitting power and synchronously reproducing movement at a distance which comprises in combination, two sets of at least three cylinders, all the cylinders of one set having their axes located in the same plane, each set comprising the same number of cylinders similarly disposed with respect to one another, two sets of at least three movable partitions adapted to reciprocate in a fluid tight manner in said cylinders respectively, at least three pipes each connecting the closed end of a cylinder of one set with the closed end of the corresponding cylinder of the other set, a liquid entirely filling the space between two corresponding movable partitions, two identical crank-shafts respectively at right angles to the axes of the cylinders of said two sets respectively, connecting means between the first crank-shaft and the corresponding movable partitions, a plurality of rigid elements secured each to a movable partition of the second set and adapted to reciprocate therewith, and connecting means identical to the first mentioned connecting means interposed between said reciprocating elements and the second crank-shaft respectively, the last mentioned connecting means being disposed in directions with respect to the cylinders of the second set which are respectively directly opposite to those of the first mentioned connecting means with respect to the cylinders of the first set, whereby rotation of one of the shafts is synchronously transmitted to the other shaft.

4. A hydraulic system for transmitting power and synchronously reproducing movement at a distance which comprises in combination, two sets of at least three cylinders, all the cylinders of one set having their axes located in the same plane, each set comprising the same number of cylinders similarly disposed with respect to one another, two sets of at least three movable partitions adapted to reciprocate in a fluid tight manner in said cylinders respectively, at least three pipes each connecting the closed end of a cylinder of one set with the closed end of the corresponding cylinder of the other set, a liquid entirely filling the space between two corresponding movable partitions, two identical crank-shafts respectively at right angles to the axes of the cylinders of said two sets respectively, a rod rigidly secured to each of the above mentioned movable partitions, a plurality of connecting rods journalled at one end to the first crank-shaft and at the other ends each to one of the rods rigidly secured to the movable partitions of the first set, a plurality of rigid elements secured each to one of the rods fixed to the movable partitions of the second set and adapted to reciprocate therewith, and a plurality of connecting rods secured pivotally to said reciprocating elements respectively and journalled all to the second mentioned crank-shaft, the last mentioned connecting rods being disposed in directions with respect to the cylinders of the second set which are respectively directly opposite to those of the first mentioned connecting rods with respect to the cylinders of the first set, whereby rotation of one of the shafts is synchronously transmitted to the other shaft.

5. A hydraulic system for transmitting power and synchronously reproducing movement at a distance which comprises in combination, two identical cylinders, two movable partitions respectively adapted to reciprocate in said cylinders, a liquid entirely filling the space between the two movable partitions, two identical crank-shafts respectively at right angles to the axes of the two cylinders, a rod rigidly fixed to each of said movable partitions, said rods extending throughout opposite ends of the cylinders with reference to their respective crank-shafts, a connecting rod between the rod rigidly fixed to the first movable partition and the corresponding crank-shaft, a rigid element surrounding the second cylinder in a diametral plane thereof, secured to the rod rigidly fixed to the second movable partition and adapted to reciprocate therewith, and a connecting rod identical with the first mentioned connecting rod interposed between the second crank-shaft and the portion of said rigid element located on the opposite side of said cylinder from the outer end of the rod fixed to the movable partition thereof, whereby rotation of one of the shafts is synchronously transmitted to the other shaft.

6. A hydraulic system for transmitting power and synchronously reproducing movement at a distance which comprises in combination, two sets of at least three cylinders, all the cylinders of one set having their axes located in the same plane, each set comprising the same number of cylinders similarly disposed with respect to one another, two sets of at least three movable partitions adapted to reciprocate in said cylinders respectively, at least three pipes each connecting the closed end of one cylinder of one set with the closed end of the corresponding cylinder of the other set, a liquid entirely filling the space between two corresponding movable partitions, two identical crank-shafts respectively at right angles to the axes of the cylinders of said two sets respectively, a rod rigidly fixed to each of the above mentioned movable partitions, the rods of one set extending throughout opposite ends of their cylinders as compared with the rods of the other set, with reference to the crank shaft of each set respectively, a plurality of connecting rods journalled at one end to the first crank-shaft and at the other ends each to the rod rigidly fixed to one of the movable partitions of the first set respectively, a plurality of rigid elements secured each to one of the rods rigidly fixed to the movable partitions of the second set and adapted to reciprocate therewith, each of said elements surrounding the corresponding cylinder in the diametral plane thereof, and a plurality of connecting rods journalled all to the second mentioned crank-shaft and respectively to each of said reciprocating elements at the portion thereof located on the opposite side of the corresponding cylinder from the outer end of the rod fixed to the movable partition thereof.

MAURICE CHARLES.